Sept. 18, 1956     O. R. HEIDENRICH     2,763,389
INDUSTRIAL TRUCK TRAILER

Filed July 13, 1955     2 Sheets-Sheet 1

INVENTOR.
OLIVER R. HEIDENRICH
BY Gobrick and Gobrick
His Attorneys

Sept. 18, 1956     O. R. HEIDENRICH     2,763,389
INDUSTRIAL TRUCK TRAILER
Filed July 13, 1955     2 Sheets-Sheet 2
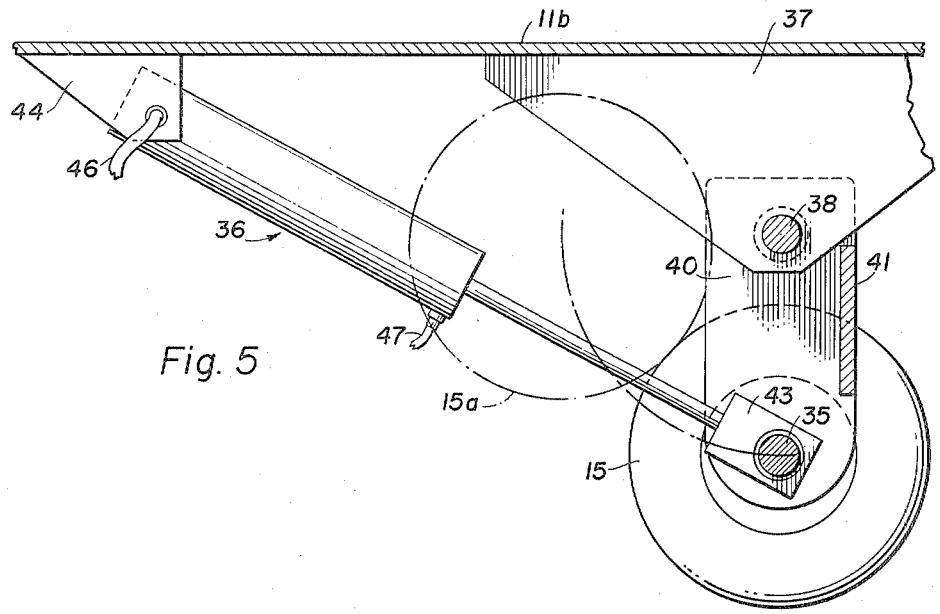
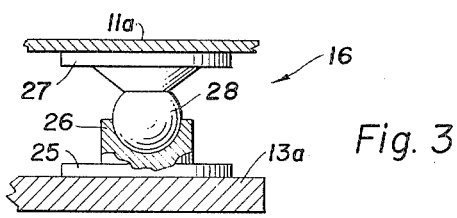
*INVENTOR.*
OLIVER R. HEIDENRICH
BY *Gobrick and Gobrick*
His Attorneys United States Patent Office 2,763,389
Patented Sept. 18, 1956

2,763,389

INDUSTRIAL TRUCK TRAILER

Oliver R. Heidenrich, Pittsburgh, Pa., assignor to The Elwell-Parker Electric Company, Cleveland, Ohio, a corporation of Ohio Application July 13, 1955, Serial No. 521,695

3 Claims. (Cl. 214—506)

The present invention relates to an industrial truck and trailer combination adapted to loading, transport and deposit of heavy loads.

Many materials, such as steel in the form of plates or sheets—which may be on the order of five feet by twelve feet in size—are shipped in bound sheet stacks running often to weights of several thousand pounds. Because of such weight and dimensions the stacks or bundles as unit loads often are awkward to handle and transport within and about a plant, and particularly in loading and unloading railroad cars by which the material is frequently shipped. Hitherto combinations of certain lift type industrial trucks with trailers have been used for transport of the stacks, with the trailer coupled to an elevatable carriage of the truck. Not only did the industrial truck serve as a tractor for the load-carrying trailer in a vehicle combination often able to maneuver in locations such as railroad cars and confined storage areas inaccessible to larger vehicles, but also by elevation of the carriage the trailer could be tilted about the trailer wheels as a fulcrum to slide the stack off the trailer and deposit it at a selected location on the ground or other supporting surface.

In these prior truck and trailer combinations, however, depositing the stack by raising the elevator carriage to tilt the trailer and slide the load therefrom was an unsafe procedure because of the instability frequently arising in the trailer and truck combination. Such instability usually occurred in consequence of the necessary shifting of the center of gravity of the load back beyond the trailer wheels, whereby the trailer bed with wheels as fulcrum became in effect a first class lever applying an upward force to the truck through the raised carriage, which tended to lift or kick up the rear of the truck. Further, with the point of coupling on the elevator carriage at a high point during tilting of the trailer, any lateral force components developed or present tended to tip the truck sideways.

The present invention includes an industrial truck tractor and trailer combination for handling loads of the character described, which has a high degree of stability in all operations, and particularly in the operation of sliding the load from the trailer through the lifting of an elevated carriage. To this end there is provided toward the rear end of the trailer a set of axially aligned wheels hingedly mounted to the trailer chassis to be swung as a unit toward the trailer bed. The wheels may be journalled on a common axle, and power means such as an hydraulic piston and cylinder unit serve to retract the axle lowering the rear end of the trailer into contact with the ground, so that the rear end portion serves as a fulcrum in the tilting operation through carriage elevation. Thus there is no possibility of developing an upward component applied to the truck through the elevator carriage and the prime cause of dangerous instability in prior combinations is obviated. Further the coupling between the front of the trailer and the elevatable carriage is preferably in the form of a universal swivel, such as a ball and socket joint vertically arranged beneath the trailer and on the elevatable carriage. Such swivel connection permits in the trailer not only a suitable following of the truck but also an accommodation to differences in level and direction in the parts of the supporting surface underlying truck and trailer, and thereby serves to minimize lateral force components applied to the truck by the trailer because of such lateral differences in level or inclination.

To facilitate movement of the trailer even when the back end is in contact with the ground or other surface, rollers may be provided at the extreme end of the bed to serve as the actual contact elements; or a rounded wedge skid or apron, pivoted at the end of the bed on a transverse axis, which may serve not only as a skid type contact element but also as a tapered wedge or inclined plane guiding a load slid upwardly onto the tilted trailer bed. For greater facility in manipulation and flexibility in application of this combination, a power winch is provided at the forward end of the trailer bed so that by means of suitable hook and cable devices a load may be held on the bed during travel, a load at ground or floor level may be drawn onto the trailer bed in tilted disposition, and also controlling forces may be applied in unloading either certain stack materials or other types of loads than those stack unit loads for which the invention is primarily intended.

An object of the present invention is then to provide a lift type industrial truck and trailer combination wherein the trailer may be tilted by operation of the elevator mechanism of the truck to deposit a load therefrom with safety and stability of the combination. Another object is the provision of an industrial truck and trailer combination having a retractable trailer axle which may be power moved to or from normal running position to lower and raise the back end of the trailer bed into and out of contact with the ground or operating floor surface. A still further object is the provision of a truck and trailer combination, wherein the back edge of the trailer may be brought into contact with the ground, including power means for drawing a load onto the trailer. A still further object is the provision of a truck and trailer combination having improved maneuverability in depositing a load at a selected location by tilting of the trailer bed. Other objects and advantages of the invention will appear in the following description and the drawings wherein:

Fig. 3 is a fragmentary detail showing a swivel connection between the forward part of the trailer and the elevatable carriage of the truck;

Fig. 5 is a fragmentary detail showing the axle retracting mechanism; and

Figure 1:
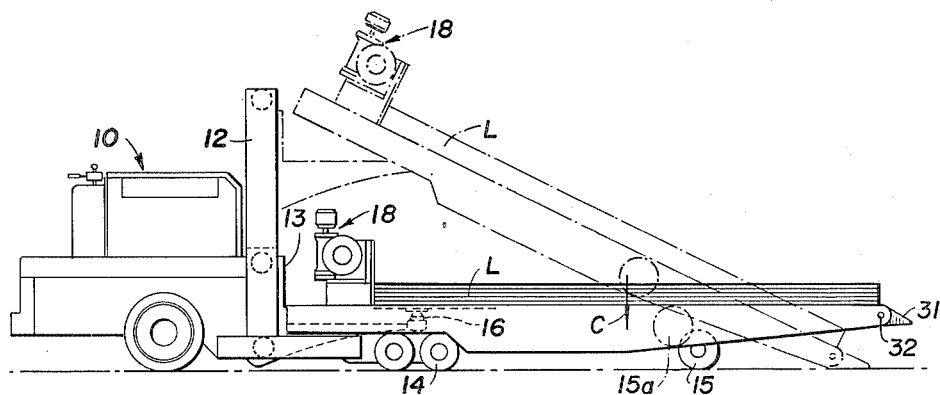
Fig. 1 is a side view of a lift type industrial truck and trailer embodying the present invention, the solid lines showing the load transporting or normal travel relation of elements; and the dashed outlines, the position of certain elements for deposit or acceptance of a load relative to an operating or ground surface.
Figure 2:
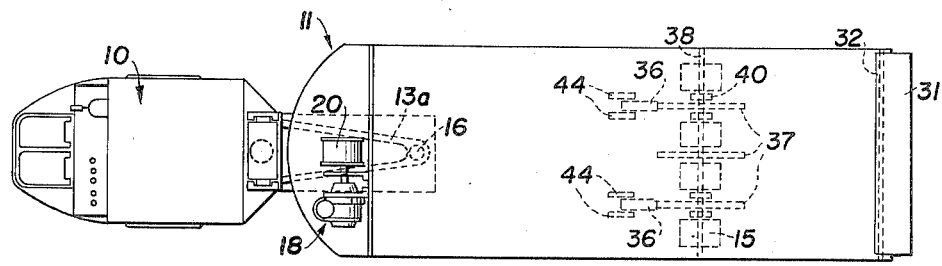
Fig. 2 is a partial plan view corresponding to Fig. 1.
Figure 6:
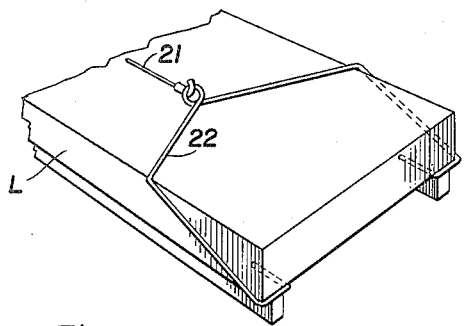
Fig. 6 is a fragmentary detail of certain cable and hook arrangements which may be used for load engagement.

In the drawings there is shown the combination of a dirigible self-powered lift type industrial truck indicated by the general reference numeral 10 with a trailer indicated by the general reference numeral 11. For convenience of description in this specification and the claims, fore and aft directions in the combination will be determined by considering the back end of the truck to be that to which the trailer is coupled, irrespective of terms ordinarily applied to the truck per se. The truck has an elevator frame 12 whereon there is mounted a vertically movable elevator carriage 13 having a horizontal member extending rearwardly for mounting a trailer coupling. This truck, the elevator mechanism and power means therefor may be any of several types known to the prior art, but it is highly desirable that the truck be of a type where the rear wheels lie beneath, rather than forward of the elevator carriage for reasons hereinafter stated.

The general construction of the trailer is determined by usual chassis design considerations such as the weight and type of load intended to be handled as well as running clearances for the environment of use. Further specific provision is made for an axle retracting mechanism associated with trailer wheels 15, suitable coupling means between the truck and trailer for draft and tilt of the trailer as the swivel connection 16 between the elevator carriage and trailer, and preferably, also, both a ground contacting structure 17 at the back end of the trailer as the actual fulcrum, and a power means, such as power winch 18 to aid in loading the trailer or controlling its load. The mounting of the wheels 15 should of course be so chosen that normal traveling position of the wheels lies safely behind the location of the center of gravity C for anticipated loading as required by considerations of running stability; and, with respect to the trailer length and normal travel height of the trailer, and expected loading, so that upon retraction of the wheels 15 the back end of the trailer comes to bear upon the ground before the load center of gravity is shifted backward of the ground bearing point of the wheels. The latter requirement is directed toward ensuring stability of the vehicle combination particularly during tilting of the trailer to move the load therefrom, and when a load is drawn up upon the tilted trailer.

The trailer appearing in the drawings, intended for a heavy stacked plate or sheet steel loading, has an elongated flat load supporting bed at the fore part of which is mounted a power winch mechanism 18 with a centered barrel or winding drum 20 rotatable about a transverse horizontal axis for winding or paying out a suitable cable 21 or the like engaged directly or through hooks 22 with the load L. The drum may be conveniently driven through suitable gearing by a hydraulic or electric motor deriving its power through flexible hoses or cables from a source of hydraulic pressure or electric energy on the truck. With a cable looped about the load or secured thereto by a hook, the load may be drawn up onto the tilted trailer, and thereafter held in position for travel after the trailer is brought to its normal horizontal travel position.

The trailer is coupled to the truck by a swivel connection which permits not only a horizontal pivoting relative to the direction of truck travel and a lateral or longitudinal canting between the vehicles when encountering ground or floor slopes diverse in lateral or longitudinal directions, but also a marked tilting of the trailer upon upward movement of the elevator carriage 13. In detail Fig. 3, as one form of simple coupling attaining these ends, there is shown a ball and socket coupling transversely centered on the carriage and trailer. This coupling includes a female member 25 secured to the top of a horizontal rearwardly extending plate 13a or the like of the carriage 13 and having an upwardly open semi-spherical socket or seat formation 26; and a downwardly extending male member 27 having a spherical head 28 seated in the socket 26, the member 27 being secured to the bottom of a portion 11a of the forward end of the trailer overhanging the elevator carriage structure. For truck stability, the coupling member 25 preferably is located forward of the rearmost wheels 14 of the truck, so that that part of the total trailer load bearing downward on the carriage does not tend to lift the front end of the truck. The coupling bearing point may of course be back of the rear truck wheels where the resultant moment, relative to a counter moment due to truck weight, is not objectionable.

Figure 4:
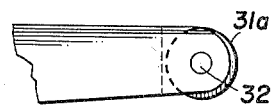
Fig. 4 is a modification of the ground contacting or fulcrum structure at the back end of the trailer.

At the extreme rear of the trailer, as a skid type ground contact means, an apron 31, roughly wedge shape in cross section with rounded base and apex, extends across the width of the bed. The apron is pivotally mounted by a transverse pivot shaft 32, running through the thick or base part thereof, to rearwardly projecting side plates of the chassis. When the trailer is tilted, the apron 31 meets the ground or floor as an extended contact surface, and the trailer may thereafter be maneuvered bearing upon the apron as a pivoted skid to avoid catching or digging into the supporting surface. Further with the disclosed rearwardly convergent wedge shape, the skid or apron serves as an inclined plane or bridge from the ground level to the top or bed surface of the trailer facilitating such operations as drawing a load onto the tilted trailer say by means of winch and cable. In Fig. 4 a modification of the ground contact structure is shown, comprised of a series of rollers 31a, rotatably mounted on shaft 32, which may also be supported intermediate its ends by bracket plates or other rearwardly extending members of the chassis. Such rollers likewise prevent the back of the trailer from digging into ground or floor upon movement of the vehicles. The chassis or frame is tapered rearwardly from the region of the wheels to minimize the "step" or elevation of the bed above ground level when the trailer is tilted.

The trailer here is shown with four wheels 15 for heavy loading, which are rotatably mounted (see Fig. 5) and axially fixed on a common retractable axle 35 to be swung forwardly by a pair of parallel like double acting hydraulic piston and cylinder units 36 from the normal running or travel position shown in full lines to a retracted position indicated by in dot and dash outline at 15a.

Secured to the underside of the trailer at 11b are three like downwardly extended spaced heavy pivot bracket plates 37 through which extends a fixed pivot rod 38. The latter may be supported endwise in side plates of the frame. Two arms 39, each located between a corresponding pair of the wheels, with upper ends pivotally mounted on the pivot rod 38 and having the axle 35 passed through and secured against axial movement to their lower ends, provide the swing mounting of the wheels. Each arm 39 as here shown is constituted of a spaced pair of plates 40 joined at the rear by a spacer 41 welded therebetween to accommodate a corresponding pivot bracket 38 and a piston rod anchor block 43 respectively between the upper and lower ends of the plates. The anchor block 43 pivots on the axle.

Each double acting unit 36 is supported at the upper end of its cylinder between a spaced pair of cylinder anchor brackets 44 by diametrically opposed radial pivot studs journalled in aligned pivot apertures of the brackets, and the piston rod of the unit is threaded into the anchor block 43 for a pivotal connection to the axle.

One cylinder stud of each unit has a threaded bore communicating as a fluid inlet with the end space of the cylinder, to which stud is connected a fluid supply line 46 to supply fluid under pressure for expanding the unit in moving the wheels to running position; and near the opposite or working end of the cylinder a second fluid inlet is connected to another fluid supply line 47 for application of pressure in moving the piston in the opposite direction retracting the wheels. The corresponding inlets of the two cylinders are of course connected in common by the supply lines 46 and 47 respectively so that the hydraulic units act in unison in advancing and retracting the wheel axle.

Since the elevator controls, used in tilting the trailer, are located at the operator's station of the truck, so also are the controls for the hydraulic units 36. A fluid reservoir and motor driven hydraulic pump located on the truck may provide hydraulic power not only for units 36 but also for winch 18 and actuating units of the truck itself. To control the units 36, a two way or fluid reversing valve located on the truck may be used selectively to direct fluid under pressure from the hydraulic pump to line 46 and from line 47 to the reservoir in moving the axle to running position, to reverse the directions of flow in the lines for axle retraction, and to block flow relative to the cylinders to lock the axle at some particular position. In carrying the lines 46 and 47 over into the truck, flexible hoses or other such conduits are used because of the relative movement of truck and trailer.

In tilting a trailer of the design shown in the drawings, the carriage elevation is started as the wheel axle is retracted, so that the back end structure 17 comes to bear on the ground before any other part of the chassis, except the wheels, should contact the ground; the carriage elevation, hence tilting, is continued until the load slides into ground contact, and with forward movement of the truck the load may be slid completely from the bed to ground. For normal travel thereafter, the carriage is lowered and the wheels advanced to normal position.

Other axle retracting mechanisms, wheel mounting means, swivel and end ground contacting designs may be used according to this invention, the scope of which is defined by the following claims.

I claim:

1. For use in a lift type industrial truck and trailer vehicle combination adapted to trailer unloading by tilting of the trailer through elevation of a lift elevator carriage of the truck, a trailer comprising: a trailer frame providing a load bearing bed, a plurality of axially aligned frame supporting wheels near the rear of the frame, a swivel type coupling at the fore part of the frame whereby the trailer may be coupled to the lift carriage of a lift type truck, wheel mounting means pivotally securing the wheels beneath the frame to swing from a normal running position to a position retracted upward toward the frame, and power actuated means for shifting the wheels from one to the other of said positions, whereby the wheels may be retracted and the forward end of the trailer lifted to bring the rear of the frame into ground contact as a fulcrum for trailer tilting to discharge a load therefrom.

2. A trailer as described in claim 1, provided at the frame rear with ground contact means adapted to avoid digging into and motion-obstructing engagement with the ground by the frame upon maneuvering of the trailer when tilted.

3. A trailer as described in claim 1 wherein said power actuated means is an hydraulic piston and cylinder unit pivotally operatively mounted between the frame and said wheel mounting means.

References Cited in the file of this patent

UNITED STATES PATENTS

| 1,870,689 | Remde | Aug. 9, 1932 |
| 1,870,690 | Remde | Aug. 9, 1932 |
| 2,459,506 | Dempster et al. | Jan. 18, 1949 |
| 2,706,009 | Schramm | Apr. 12, 1955 |
| 2,717,707 | Martin | Sept. 13, 1955 |

FOREIGN PATENTS

| 849,883 | France | Aug. 28, 1939 |